US012528469B2

(12) United States Patent
Tokoi et al.

(10) Patent No.: US 12,528,469 B2
(45) Date of Patent: Jan. 20, 2026

(54) CONTROL DEVICE FOR VEHICLE, CONTROL METHOD FOR VEHICLE, AND PROGRAM

(71) Applicants: JATCO Ltd, Fuji (JP); NISSAN MOTOR CO., LTD., Yokohama (JP)

(72) Inventors: Hiroyuki Tokoi, Isehara (JP); Keisuke Iwado, Ebina (JP); Itaru Shinohara, Atsugi (JP); Sunho Lee, Seoul (KR); Satoshi Nakano, Chikusei (JP)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/847,326

(22) PCT Filed: Feb. 14, 2023

(86) PCT No.: PCT/JP2023/004940
§ 371 (c)(1),
(2) Date: Sep. 16, 2024

(87) PCT Pub. No.: WO2023/176249
PCT Pub. Date: Sep. 21, 2023

(65) Prior Publication Data
US 2025/0206308 A1    Jun. 26, 2025

(30) Foreign Application Priority Data

Mar. 18, 2022   (JP) ................. 2022-044241

(51) Int. Cl.
*B60W 30/18*   (2012.01)
*B60W 10/02*   (2006.01)
(Continued)

(52) U.S. Cl.
CPC .... *B60W 30/18018* (2013.01); *B60W 10/023* (2013.01); *B60W 10/026* (2013.01);
(Continued)

(58) Field of Classification Search
CPC ...... B60W 10/06; B60W 10/08; B60W 10/10; B60W 10/02; B60W 10/023;
(Continued)

(56) References Cited

U.S. PATENT DOCUMENTS 10,449,964 B2 * 10/2019 Iwamoto ................. F02D 17/00
11,174,803 B2    11/2021 Tsuchiya
(Continued)

FOREIGN PATENT DOCUMENTS

JP    2006-266097 A    10/2006
JP    2010-149539 A    7/2010
(Continued)

*Primary Examiner* — Roger L Pang
(74) *Attorney, Agent, or Firm* — Foley & Lardner LLP

(57) ABSTRACT

A control device for a vehicle is used in a vehicle that travels by transmitting a driving force from an engine to a drive wheel via a clutch. The control device includes a controller configured to perform an engine stop control in which, when an accelerator is not operated while the vehicle is traveling, a supply of a fuel to the engine is stopped and the clutch is released to enter a driving force cut-off state; a first control in which, when the accelerator is operated while the engine has a rotation speed higher than a first rotation speed in the driving force cut-off state, the engine is activated and the clutch has a torque transmission capacity; and a second control in which, when the accelerator is operated while the engine has the rotation speed equal to or lower than the first rotation speed in the driving force cut-off state, the engine is activated after the engine stops and the clutch has the torque transmission capacity after the engine is activated.

6 Claims, 4 Drawing Sheets

(51) Int. Cl.
 *B60W 10/06* (2006.01)
 *B60W 10/08* (2006.01)
 *F02D 41/04* (2006.01)
 *F02D 41/06* (2006.01)
 *F02N 11/04* (2006.01)
 *F02N 11/08* (2006.01)

(52) U.S. Cl.
 CPC ............ *B60W 10/06* (2013.01); *B60W 10/08* (2013.01); *B60W 30/18072* (2013.01); *F02D 41/042* (2013.01); *F02D 41/062* (2013.01); *F02N 11/04* (2013.01); *F02N 11/0803* (2013.01); *B60W 2030/1809* (2013.01); *B60W 2510/0638* (2013.01); *B60W 2540/10* (2013.01); *B60W 2710/021* (2013.01); *B60W 2710/06* (2013.01)

(58) Field of Classification Search
 CPC ..... B60W 30/18018; B60W 30/18072; B60W 2030/1809; B60W 2510/0638; B60W 2540/10; B60W 2710/08; B60W 2710/06; B60W 2710/021

USPC ................................ 701/67; 477/5, 178, 181
 See application file for complete search history.

(56) References Cited

U.S. PATENT DOCUMENTS

| 11,440,395 B2* | 9/2022 | Hu ..................... B60W 10/06 |
| 2012/0172175 A1* | 7/2012 | Nedorezov ......... B60W 10/026 477/169 |
| 2021/0171016 A1* | 6/2021 | Ishiwada ............... B60W 30/20 |
| 2023/0182717 A1* | 6/2023 | Bichkar .................. B60K 6/48 |

FOREIGN PATENT DOCUMENTS

| JP | 2013-213557 A | 10/2013 |
| JP | 2014-097773 A | 5/2014 |
| WO | WO-2019/069345 A1 | 4/2019 |

\* cited by examiner

CONTROL DEVICE FOR VEHICLE, CONTROL METHOD FOR VEHICLE, AND PROGRAM

TECHNICAL FIELD

The present invention relates to vehicle control and a program.

BACKGROUND ART

Patent Document 1 discloses a technique in which an electric oil pump is provided in addition to a mechanical oil pump, and a lubricating oil is supplied to a gear by the electric oil pump at the time of executing N coasting. In the N coasting, a vehicle is driven in a state in which a clutch is disengaged during a coasting travel and an engine rotation speed is lower than that of when the clutch is engaged.

PRIOR ART DOCUMENT

Patent Document

Patent Document 1: JP 2013-213557 A

SUMMARY OF INVENTION

In a vehicle having a configuration in which a vehicle travels by transmitting a driving force from an engine to a drive wheel via a clutch, when a driving force to a clutch is cut off and a supply of a fuel to the engine is stopped during the traveling, a driver may request acceleration by an accelerator operation. However, in this case, depending on a method of activating the engine and a method of supplying a hydraulic pressure to the clutch, it may not be possible to activate the engine quickly. As a result, a delay in activation of the engine may cause the vehicle to accelerate slowly, which may cause the driver to feel uncomfortable.

The present invention has been made in view of such a problem, and an object thereof is to prevent a delay in activating an engine in response to an accelerator operation while traveling, and to reduce a sense of discomfort felt by a driver.

A control device for a vehicle according to an embodiment of the present invention is used in a vehicle that travels by transmitting a driving force from an engine to a drive wheel via a clutch. The control device includes a controller configured to stop a supply of a fuel to the engine and release the clutch to bring the clutch into a driving force cut-off state when an accelerator is not operated while the vehicle is traveling, activate the engine and cause the clutch to have a torque transmission capacity when the accelerator is operated while the engine has a rotation speed higher than a first rotation speed in the driving force cut-off state, and activate the engine after the engine stops rotating and cause the clutch to have the torque transmission capacity after the engine is activated when the accelerator is operated while the engine has a rotation speed equal to or lower than the first rotation speed in the driving force cut-off state.

According to another aspect of the present invention, a control method for a vehicle and a program corresponding to the control device for a vehicle are provided.

According to these aspects, a clutch does not has a torque transmission capacity until an engine is activated when an accelerator is operated after a rotation speed of the engine becomes low, and thus the engine, which is to stop rotating, can be prevented from being dragged by the clutch and rotating. As a result, the engine can quickly stop rotating and then is activated. Therefore, it is possible to prevent a delay in activation of the engine in response to the accelerator operation while the vehicle is traveling, and to reduce the sense of discomfort felt by a driver.

DESCRIPTION OF EMBODIMENTS

Hereinafter, an embodiment of the present invention will be described with reference to the accompanying drawings.

Figure 1:
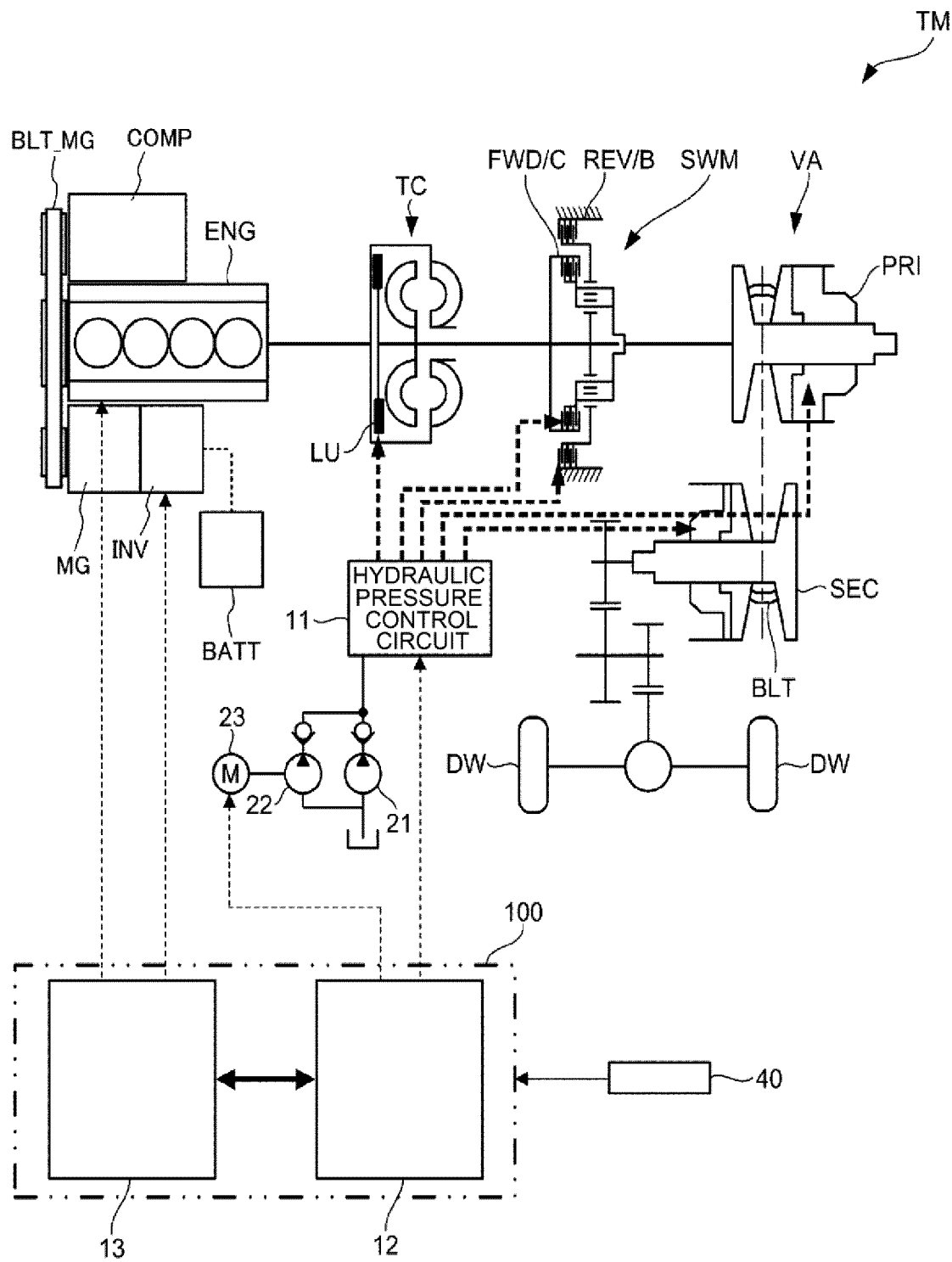
FIG. 1 is a schematic configuration diagram of a vehicle according to the present embodiment.

FIG. 1 is a schematic configuration diagram of a vehicle according to the present embodiment. A vehicle includes an engine ENG, a motor generator MG, a transmission TM, and drive wheels DW. The engine ENG constitutes a drive source of the vehicle. In the vehicle, an engine torque Te of the engine ENG is transmitted to the drive wheels DW via the transmission TM. In other words, the transmission TM is provided in a power transmission path connecting the engine ENG and the drive wheels DW. The engine ENG is provided with a motor belt BLT_MG. The motor belt BLT_MG connects the engine ENG with a compressor COMP for an air conditioner and the motor generator MG, and mediates power transmission therebetween. Therefore, a part of the engine torque Te can be transmitted to the compressor COMP and the motor generator MG via the motor belt BLT_MG.

The motor generator MG is connected to the engine ENG via the motor belt BLT_MG on a power transmission path. The motor generator MG is electrically connected to a battery BATT via an inverter INV. The motor generator MG has a function as an electric motor that is rotationally driven by receiving power supplied from the battery BATT, and a function as a power generator that generates electric power by being rotated by an external force. In the present embodiment, the motor generator MG is used as the power generator, and is configured as a belt start generator used for driving the engine ENG via the motor belt BLT_MG at the time of activating the engine ENG. Accordingly, from the viewpoint of the power to be ensured, it becomes possible to restrict a size of the motor generator MG to a size appropriate for activating the engine ENG. Including the case in which the motor generator MG is configured in this way, the motor generator MG can also provide a motor assist by being used for driving the drive wheels DW together with the engine ENG.

The transmission TM includes a torque converter TC, a forward and reverse switching mechanism SWM, and a variator VA. The torque converter TC transmits power via a fluid. In the torque converter TC, power transmission efficiency is enhanced by engaging a lock-up clutch LU.

The forward and reverse switching mechanism SWM is provided in a power transmission path connecting the engine ENG and the variator VA. The forward and reverse switching mechanism SWM switches the forward and reverse of the vehicle by switching a rotation direction of input rotation. The forward and reverse switching mechanism SWM includes a forward clutch FWD/C that is engaged when a forward range is selected and a reverse brake REV/B that is engaged when a reverse range is selected. When the forward clutch FWD/C and the reverse brake REV/B are disengaged, the transmission TM is in a neutral state, that is, a driving force cut-off state. In the present embodiment, the forward clutch FWD/C constitutes a clutch for transmitting a driving force from the engine ENG to the drive wheels DW. Such a clutch may be understood to include the forward clutch FWD/C and the reverse brake REV/B. The forward clutch FWD/C is a hydraulic clutch that is hydraulically operated.

The variator VA constitutes a belt continuously variable transmission mechanism including a primary pulley PRI, a secondary pulley SEC, and a belt BLT wound around the primary pulley PRI and the secondary pulley SEC. A primary pressure Ppri, which is a hydraulic pressure of the primary pulley PRI, is supplied to the primary pulley PRI from a hydraulic pressure control circuit 11 to be described later, and a secondary pressure Psec, which is a hydraulic pressure of the secondary pulley SEC, is supplied to the secondary pulley SEC from the hydraulic pressure control circuit 11.

The transmission TM further includes a mechanical oil pump 21, an electric oil pump 22, and an electric motor 23. The mechanical oil pump 21 pumps oil to the hydraulic pressure control circuit 11. The mechanical oil pump 21 is a mechanical oil pump driven by the power of the engine ENG. The electric oil pump 22 pumps the oil to the hydraulic pressure control circuit 11 together with or independently of the mechanical oil pump 21. The electric oil pump 22 is provided as an auxiliary to the mechanical oil pump 21. The electric motor 23 drives the electric oil pump 22. The electric oil pump 22 may be understood to include the electric motor 23.

The transmission TM further includes the hydraulic pressure control circuit 11 and a transmission controller 12. The hydraulic pressure control circuit 11 is formed by a plurality of flow paths and a plurality of hydraulic pressure control valves, and adjusts a pressure of the oil supplied from the mechanical oil pump 21 and the electric oil pump 22 and supplies the oil to each part of the transmission TM. The transmission controller 12 is a controller that controls the transmission TM, and is connected to an engine controller 13 that controls the engine ENG so as to be able to communicate with each other. An output torque signal representing, for example, the engine torque Te and a motor activation start determination signal to be described later are input from the engine controller 13 to the transmission controller 12.

Each of the transmission controller 12 and the engine controller 13 is implemented by one or a plurality of computers (microcomputers) including a central processing unit (CPU), a read-only memory (ROM), a random access memory (RAM), and an input/output interface (I/O interface). Each of the controllers 12 and 13 performs control by executing a program stored in a ROM or a RAM by the CPU. The program may be stored in a non-transitory storage medium such as a CD-ROM. The transmission controller 12 and the engine controller 13 constitute a controller 100 in a control device of the vehicle. The controller 100 may further include an integrated controller that performs integrated control of the transmission controller 12, the engine controller 13, and the like.

Signals from a sensor and switch group 40 indicating various sensors and switches are input to the controller 100. The sensor and switch group 40 includes, for example, a vehicle speed sensor that detects a vehicle speed VSP, an accelerator opening sensor that detects an accelerator opening APO, an engine rotation speed sensor that detects a rotation speed Ne of the engine ENG, and a brake sensor that detects a brake hydraulic pressure.

The sensor and switch group 40 further includes, for example, a primary pressure sensor that detects the primary pressure Ppri, a secondary pressure sensor that detects the secondary pressure Psec, a primary rotation speed sensor that detects a rotation speed Npri that is an input side rotation speed of the primary pulley PRI, a secondary rotation speed sensor that detects a rotation speed Nsec that is an output side rotation speed of the secondary pulley SEC, a turbine rotation speed sensor that detects a rotation speed Ntb that is an output side rotation speed of the torque converter TC, a position sensor that detects an operation position of a gear shift lever, and an oil temperature sensor that detects an oil temperature of the transmission TM. The rotation speed Npri is, for example, a rotation speed of an input shaft of the primary pulley PRI, the rotation speed Nsec is, for example, a rotation speed of an output shaft of the secondary pulley SEC, and the rotation speed Ntb is, for example, a rotation speed of an output shaft of the torque converter TC.

These signals are directly input to the transmission controller 12, or are input via the engine controller 13 or the like. The transmission controller 12 controls the transmission TM based on these signals. The transmission TM is controlled by controlling the hydraulic pressure control circuit 11 and the electric oil pump 22 based on these signals. The hydraulic pressure control circuit 11 performs hydraulic pressure control of the lock-up clutch LU, the forward clutch FWD/C, the reverse brake REV/B, the primary pulley PRI, the secondary pulley SEC, and the like based on instructions from the transmission controller 12.

In the vehicle, during forward travel, the driver may operate the accelerator when the driving force to the forward clutch FWD/C is cut off and supply of a fuel to the engine ENG is stopped. However, in this case, depending on a method of activating the engine ENG and a method of supplying the hydraulic pressure to the forward clutch FWD/C, it may not be possible to activate the engine ENG quickly. As a result, a delay in activating the engine ENG may cause the vehicle to accelerate slowly, which may cause the driver to feel uncomfortable.

In view of such circumstances, in the present embodiment, the controller 100 performs the following control.

Figure 2:
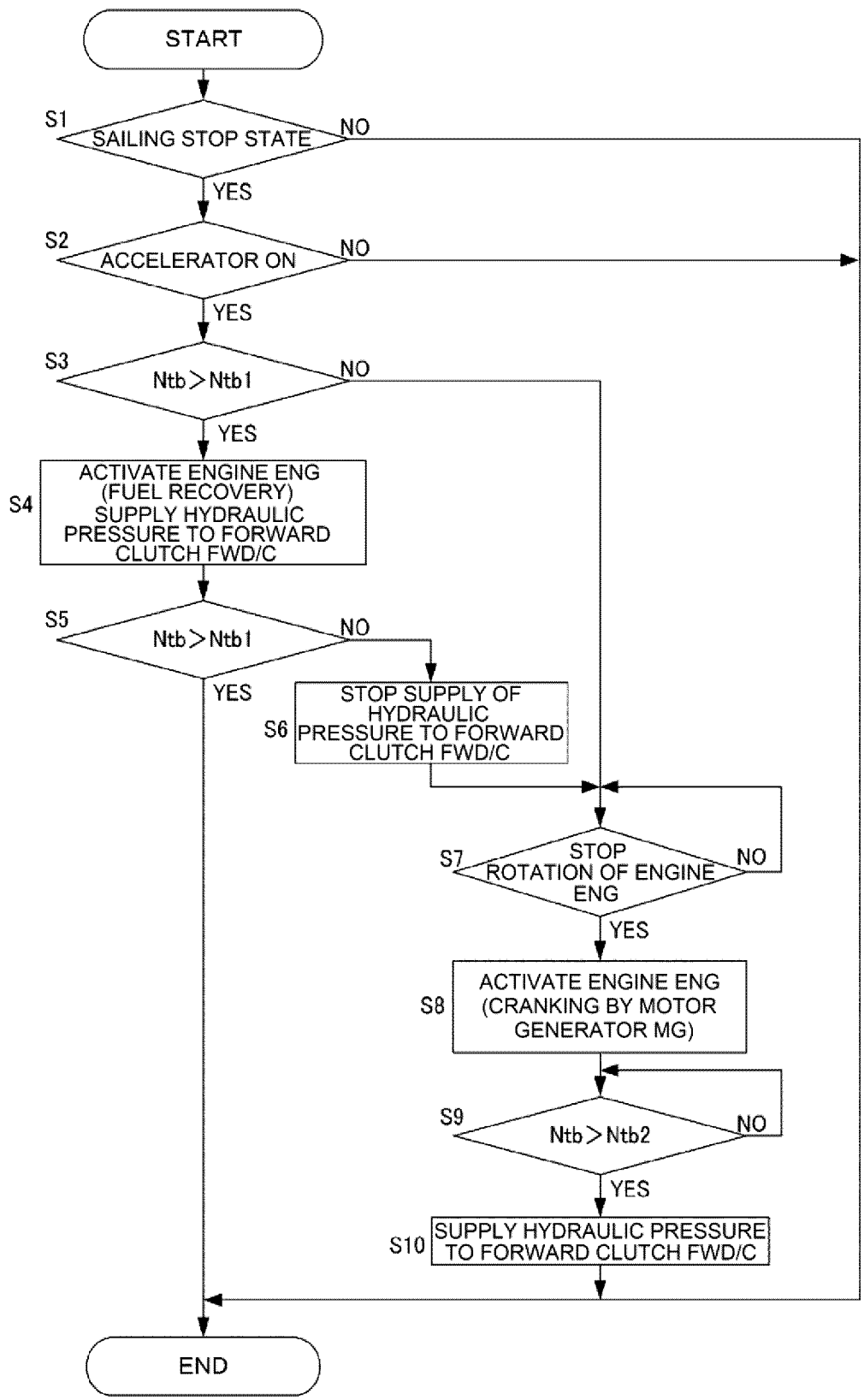
FIG. 2 is a flowchart illustrating an example of control according to the present embodiment.

FIG. 2 is a flowchart illustrating an example of control performed by the controller 100. First, steps S1 to S5 will be described. Processes from step S1 to step S5 constitute first control. The first control is control in which, when the accelerator is operated while the engine ENG has the rotation speed Ne higher than a first rotation speed Ne1 in the driving force cut-off state caused by sailing stop control, the engine ENG is activated and the forward clutch FWD/C is provided with the torque transmission capacity. Processes of steps S1 to S3 and step S5 can be performed by the transmission controller 12. In a process of step S4, the engine controller 13 can activate the engine ENG, and the transmission controller 12 can supply the hydraulic pressure.

In step S1, it is determined whether the vehicle is in a sailing stop state. When the sailing stop control is executed, the vehicle is in the sailing stop state. In the sailing stop control, when a sailing stop condition is satisfied, the supply of the fuel to the engine ENG is stopped and the forward clutch FWD/C is released and is in the driving force cut-off state. The sailing stop condition includes that the vehicle speed VSP is higher than a set vehicle speed VSP1, that an accelerator pedal is not depressed (the accelerator is not operated), that a brake pedal is not depressed (a brake is not operated), and that the forward range is selected in the transmission TM. The sailing stop condition is satisfied when all the conditions included in the sailing stop condition are satisfied. The set vehicle speed VSP1 can be set in advance so as to distinguish between a low speed and a medium and high speed.

While the sailing stop condition is satisfied, the vehicle is in the sailing stop state. Therefore, in step S1, by determining whether the sailing stop condition is satisfied, it is possible to determine whether the vehicle is in the sailing stop state. By the sailing stop control, in addition to stopping the supply of the fuel, the forward clutch FWD/C is released to be in the driving force cut-off state, thereby extending a coasting travel distance, and as a result, fuel efficiency is improved. The sailing stop control corresponds to engine stop control. If a negative determination is made in step S1, the process ends temporarily, and if an affirmative determination is made in step S1, the process proceeds to step S2.

In step S2, it is determined whether the accelerator is ON. When a depression of the accelerator pedal by the driver is not performed (when the accelerator pedal is not depressed), that is, when the accelerator is not operated, the accelerator is determined to be OFF, and the process ends temporarily. When a depression of the accelerator pedal by the driver is performed (when the accelerator pedal is depressed), that is, when the accelerator is operated, the accelerator is determined to be ON. In this case, the sailing stop condition is not satisfied, and thus the engine ENG is activated and hydraulic pressure is supplied to the forward clutch FWD/C as described below. If an affirmative determination is made in step S2, the process proceeds to step S3.

In step S3, it is determined whether the rotation speed Ntb is higher than a first rotation speed Ntb1. The determination in step S3 is made by the transmission controller 12, and at this stage, the engine ENG has not yet been activated and the hydraulic pressure has not yet been supplied to the forward clutch FWD/C. Therefore, at this stage, as a result of the rotation speed Ne decreasing in the driving force cut-off state, the rotation speed Ntb also decreases in accordance with the decrease in the rotation speed Ne. For this reason, in step S3, the determination is substantially made regarding the rotation speed Ne based on the rotation speed Ntb.

The first rotation speed Ntb1 is a determination value for permitting the activation of the engine ENG during the rotation, and when the rotation speed Ne is relatively high, the rotation of the engine ENG can be shifted to autonomous rotation, for example, by fuel recovery, which will be described later, so that the activation of the engine ENG is permitted. The first rotation speed Ntb1 is further set as a determination value for determining whether the rotation speed Ne is within a rotation speed region R in which reverse rotation of the engine ENG may occur. The rotation speed region R will be described later. Such a first rotation speed Ntb1 corresponds to the first rotation speed Ne1 which is a similar determination value for the rotation speed Ne, and is set in advance. When the rotation speed Ntb is higher than the first rotation speed Ntb1, the rotating engine ENG is permitted to be activated, and the process proceeds to step S4.

In step S4, The engine ENG is activated by the fuel recovery, and the hydraulic pressure is supplied to the forward clutch FWD/C by the fuel recovery. The engine ENG is activated as a restart for recovery from the sailing stop state. The fuel recovery is resumption of the supply of the fuel to the engine ENG, and the engine ENG is activated by transitioning to an autonomous rotation state due to the fuel recovery. The supply of the hydraulic pressure to the forward clutch FWD/C can be made by supplying the oil from the electric oil pump 22, which allows the forward clutch FWD/C to have the torque transmission capacity.

The supply of the hydraulic pressure in step S4 is performed in accordance with the accelerator operation, and is performed regardless of whether the engine ENG is activated. The supply of the hydraulic pressure in step S4 is performed before the engine ENG stops rotating. In step S4, the activation of the engine ENG and the supply of the hydraulic pressure to the forward clutch FWD/C may not be started at the same timing. The activation of the engine ENG by the fuel recovery may be accompanied by driving force assistance from the motor generator MG.

In step S5, it is determined whether the rotation speed Ntb is higher than the first rotation speed Ntb1. In step S5, it is determined whether the engine ENG is activated. The determination in step S5 can be made, for example, by determining whether the rotation speed Ntb has not fallen below the first rotation speed Ntb1 within a preset predetermined time period after the starting of the activation of the engine ENG by the fuel recovery. When the engine ENG is activated, a decrease in rotation speed Ntb does not occur in particular. Therefore, in this case, an affirmative determination is made in step S5, and the process ends temporarily.

The first control may be control that is performed in a state in which the driving force is cut off and the supply of the fuel to the engine ENG is stopped, regardless of whether the vehicle is in the sailing stop state. In other words, in the first control, the driving force cut-off state and the fuel supply stop state do not have to be achieved by the sailing stop control.

Next, processes of step S7 to step S10 will be described. These processes are performed when the negative determination is made in step S3 after passing through steps S1 and S2. The processes of steps S1 to S3 and steps S7 to S10 constitute a second control. The second control is control in which, when the accelerator is operated while the engine ENG has the rotation speed Ne equal to or lower than the first rotation speed Ne1 in the driving force cut-off state caused by the sailing stop control, the engine ENG is activated after the engine ENG stops rotating, and the forward clutch FWD/C is provided with the torque transmission capacity after the engine ENG has activated. Processes of step S7, step S9, and step S10 can be performed by the transmission controller 12 and the process of step S8 can be performed by the transmission controller 12 and the engine controller 13.

If the negative determination is made in step S3, the activation of the rotating engine ENG is not permitted, and the process proceeds to step S7. In step S7, it is determined whether the rotation of the engine ENG is stopped. If an affirmative determination is made in step S7, the process proceeds to step S8, and the engine ENG is activated. The rotation stop of the engine ENG is regulated based on a change in rotation speed Ne as described below, and the engine ENG is activated after the regulated rotation stop of the engine ENG, that is, after the rotation of the engine ENG has stopped as regulated.

Figure 3:
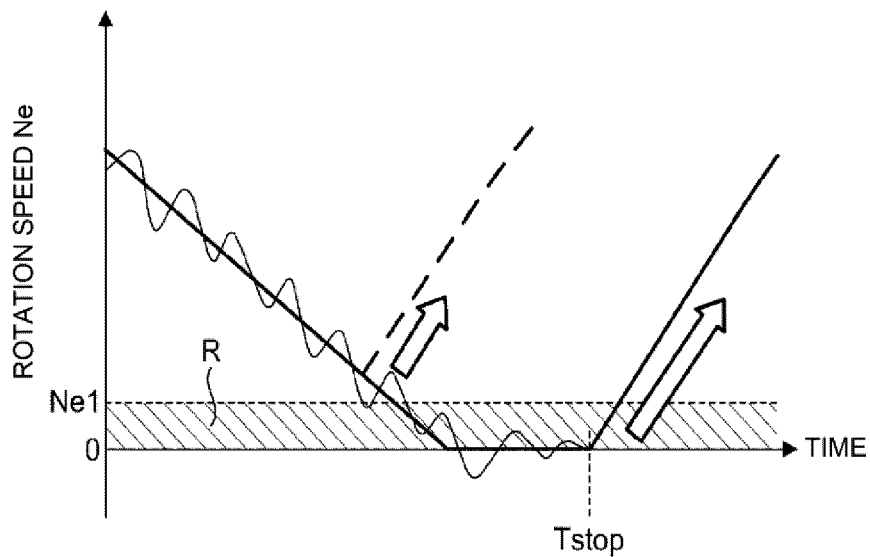
FIG. 3 is a diagram illustrating rotation stop and activation of an engine ENG.

FIG. 3 is a diagram illustrating the rotation stop and the activation of the engine ENG. A broken line indicates a case in which the engine ENG is activated by the fuel recovery.

In this case, the engine ENG is activated while the rotation speed Ne is higher than the first rotation speed Ne1 in response to the accelerator operation, and the rotation speed Ne increases. As indicated by a thin line in FIG. 3, the rotation speed Ne actually changes while fluctuating up and down. Therefore, even after the rotation speed Ne reaches zero, the rotation speed Ne continues to fluctuate up and down and gradually attenuates to converge toward zero. In other words, the rotation of the engine ENG does not immediately stop even after the rotation speed Ne becomes zero, and the engine ENG may fluctuate in rotation at a low rotation speed Ne between a forward rotation side and a reverse rotation side. Therefore, the rotation stop of the engine ENG is regulated based on such a change in rotation speed Ne. In this example, the rotation of the engine ENG is stopped as regulated at a timing Tstop at which the rotation speed Ne converges to approximately zero.

In this way, the rotation stop of the engine ENG may not be a state in which the rotation speed Ne converges completely to zero, and the engine ENG stops rotating completely. In other words, the rotation stop of the engine ENG may be based on a change such as the convergence of the rotation speed Ne to zero, and may be a state in which the rotation speed Ne has converged to approximately zero, for example, after the rotation speed Ne has become zero and has converged to zero to some extent.

Whether such rotation stop of the engine ENG has occurred is determined by the engine controller 13, and the engine controller 13 determines whether the rotation of the engine ENG has stopped based on the change such as the convergence of the rotation speed Ne to zero, as described above. As an example, such a determination can be made by determining whether the rotation speed Ne, which decreases in response to the stop of the fuel supply, has become zero a predetermined number of times or more set in advance since becoming zero. Further, for example, this determination can be made by determining whether a predetermined time set in advance has elapsed since the rotation speed Ne, which decreases in response to the stop of the fuel supply, become zero.

When the rotation of the engine ENG stops as regulated, a motor activation start determination signal which is a signal indicating that the rotation of the engine ENG has stopped, is transmitted from the engine controller 13 to the transmission controller 12. Therefore, in step S7, it is determined whether the rotation of the engine ENG is stopped by determining whether the motor activation start determination signal is ON.

While the rotation speed Ne converges toward zero, the engine ENG rotates in both forward and reverse directions, and when the engine ENG is rotating in the reverse direction, the engine ENG acts as a large load on the activation of rotating the engine ENG in the forward direction. On the other hand, the engine rotation speed sensor may be used that does not distinguish between positive and negative and cannot distinguish between rotation directions.

Therefore, in the present embodiment, the first rotation speed Ne1 is set to be higher than the rotation speed Ne that converges toward zero. That is, the first rotation speed Ne1 is set such that the rotation speed Ne converging toward zero fluctuates only within a range less than the first rotation speed Ne1, even when a negative rotation speed Ne is made positive. As a result, the activation caused by the fuel recovery, which is permitted at the rotation speed Ne higher than the first rotation speed Ne1, is not permitted in the rotation speed region R which ranges from zero to the first rotation speed Ne1 and in which the reverse rotation of the engine ENG may occur. Accordingly, the engine ENG is prevented from acting as a large load on the activation because of that the engine ENG is activated by the fuel recovery during the reverse rotation. As a result, it is possible to prevent an occurrence of a situation in which the engine ENG is not activated by the fuel recovery.

Even during the reverse rotation of the engine ENG, it is conceivable to activate the engine ENG while assisting the driving force by the motor generator MG. However, in this case, a large load is applied to the motor belt BLT_MG. Therefore, in the present embodiment, the engine ENG is activated after the rotation of the engine ENG is stopped. Accordingly, the activation of the engine ENG during the reverse rotation is avoided, which reduces a load on the motor belt BLT_MG when the motor generator MG is used for activating. At this time, since the hydraulic pressure is not supplied to the forward clutch FWD/C, the engine ENG is prevented from being dragged by the forward clutch FWD/C and rotated. Therefore, as a result of the rotation speed Ne quickly converging toward zero, the rotation of the engine ENG is quickly stopped, and therefore, it becomes possible to activate the engine ENG quickly.

Returning to FIG. 2, in step S8, the engine ENG is activated by the motor generator MG. In this case, the engine ENG is also activated as a restart for the recovery from the sailing stop state. In step S8, the engine ENG is activated using the driving force of the motor generator MG for cranking of the engine ENG. Therefore, when the activation of the engine ENG is started in step S8, the transmission controller 12 drives the motor generator MG to perform the cranking, while the engine controller 13 performs fuel injection and ignition of the engine ENG.

In step S9, it is determined whether the rotation speed Ntb is higher than a second rotation speed Ntb2. The second rotation speed Ntb2 is a rotation speed Ntb higher than the first rotation speed Ntb1, and is set in advance as a determination value for supplying the hydraulic pressure to the forward clutch FWD/CL. The second rotation speed Ntb2 is set with hysteresis relative to the first rotation speed Ntb1, and is set higher than the first rotation speed Ntb1. The second rotation speed Ntb2 indicates a second rotation speed Ne2, which is a similar determination value for the rotation speed Ne. If a negative determination is made in step S9, the process returns to step S9, and the same process is repeated. When an affirmative determination is made in step S9, it is also determined that the activation of the engine ENG is completed. In this case, the process proceeds to step S10.

In step S10, the hydraulic pressure is supplied to the forward clutch FWD/C, thereby enabling the forward clutch FWD/C to have the torque transmission capacity. In step S10, after the rotation of the engine ENG is stopped, which is determined in step S7, the activation of the engine ENG is started in step S8, the affirmative determination is made in step S9, and then the forward clutch FWD/C is provided with the torque transmission capacity, and thus after the engine ENG is activated, the forward clutch FWD/C is provided with the torque transmission capacity. Therefore, when the engine ENG is fluctuating in rotation at the low rotation speed Ne, the forward clutch FWD/C has no torque transmission capacity.

Accordingly, as described above, the engine ENG is prevented from rotating due to being dragged by the forward clutch FWD/C. As a result, the engine ENG can be activated quickly, which prevents the delay in activating the engine ENG in response to the accelerator operation, thereby reducing the sense of discomfort felt by the driver. Further, since the engine ENG is activated after the engine ENG stops rotating, the activation of the engine ENG during the reverse rotation is also avoided. As a result, this also contributes to reducing the load on the motor belt BLT_MG. After step S10, the process ends temporarily.

Even when the engine ENG is activated by the fuel recovery, the engine ENG may not be activated. In this case, a negative determination is made in step S5, and the process proceeds to step S6. In step S6, the supply of hydraulic pressure to the forward clutch FWD/C is stopped. Accordingly, even when the engine ENG cannot be activated by the fuel recovery and the engine ENG is fluctuating in rotation at the low rotation speed Ne, the forward clutch FWD/C is not required to have the torque transmission capacity. Therefore, it is possible to activate the engine ENG after quickly stopping the rotation thereof. Therefore, in this case, the process proceeds from step S6 to step S7, in which the same process as that in the case in which the negative determination is made in step S3 is performed. The process of step S6 can be performed by the transmission controller 12.

Similarly to the first control, the second control may be control that is performed in driving force cut-off state and the fuel supply stop state, regardless of whether the vehicle is in the sailing stop state.

Figure 4:
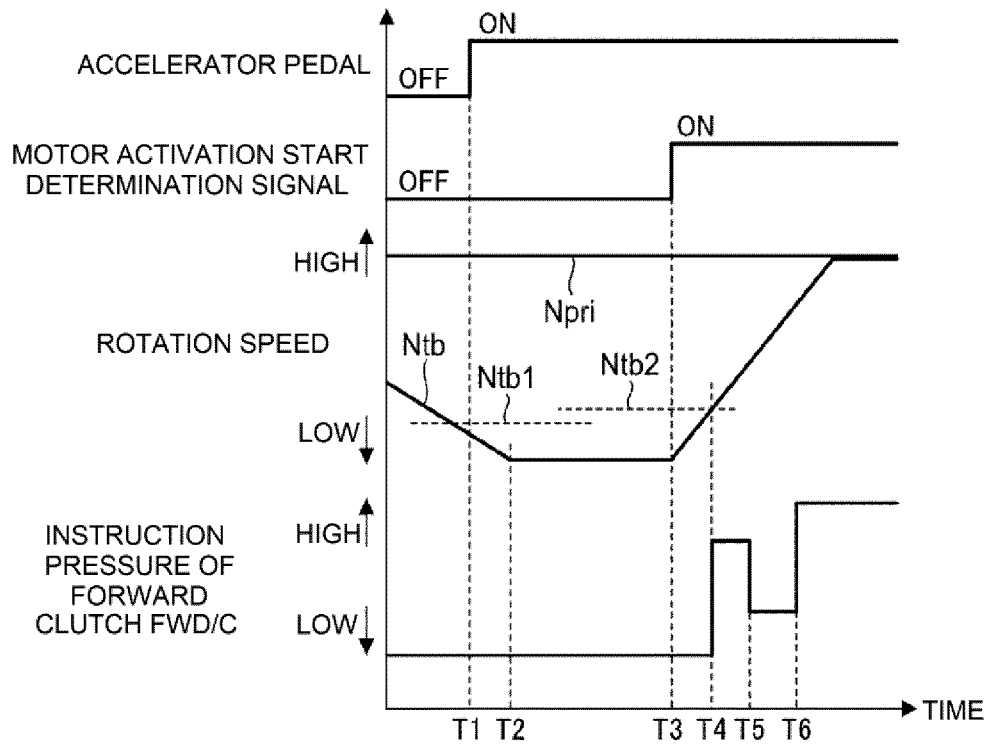
FIG. 4 is a diagram illustrating a first example of a timing chart according to the present embodiment.

FIG. 4 is a diagram showing a first example of a timing chart corresponding to the flowchart shown in FIG. 3. Before a timing T1, during the sailing stop, the accelerator pedal is OFF (state in which the accelerator is not operated), and the rotation speed Ntb is gradually decreasing. At the timing T1, the accelerator is operated, and the accelerator pedal is turned ON. As a result, the sailing stop condition is not satisfied. At the timing T1, the rotation speed Ntb is equal to or lower than the first rotation speed Ntb1 and the rotation is not stopped. Therefore, in this example, the hydraulic pressure is supplied to the forward clutch FWD/C after the rotation of the engine ENG is stopped.

At a timing T2, a decreased rotation speed Ntb is constant. However, as described above, the rotation speed Ne may actually fluctuate up and down, and the rotation of the engine ENG may be not stopped at the timing T2. The rotation of the engine ENG is stopped at a timing T3, the motor activation start determination is turned ON, and the engine ENG is activated. As a result, the rotation speed Ntb starts to rise from the timing T3.

The motor activation start determination signal is transmitted from the engine controller 13 to the transmission controller 12 as described above, and the determination is turned ON when the rotation of the engine ENG stops. Therefore, when the motor activation start determination is turned ON, the rotation speed Ne has converged to approximately zero. Therefore, when the engine ENG is activated at the timing T3, the engine ENG is prevented from acting as the large load, and the belt BLT is protected.

The rotation speed Ntb is higher than the second rotation speed Ntb2 at a timing T4. As a result, an instruction pressure of the forward clutch FWD/C is higher than a release instruction pressure of the forward clutch FWD/C, and thus the hydraulic pressure is supplied to the forward clutch FWD/C. The instruction pressure is set at the timing T4 to a pre-charge pressure that fills the forward clutch FWD/C with the oil prior to engagement, and at a timing T5 to a stroke pressure that eliminates backlash in a piston of the forward clutch FWD/C, and at a timing T6 to a full engagement pressure that completely engages the forward clutch FWD/C. The torque transmission capacity of the forward clutch FWD/C occurs between the timing T5 at which the instruction pressure is set to the stroke pressure and the timing T6.

Before the timing T3, the hydraulic pressure is not supplied to the forward clutch FWD/C. Therefore, the rotation of the engine ENG caused by the drag of the forward clutch FWD/C is prevented between the timing T2 and the timing T3, and the rotation speed Ne quickly converges to zero. As a result, the rotation of the engine ENG is quickly stopped at the timing T3, and the engine ENG can be activated quickly accordingly.

Figure 5:
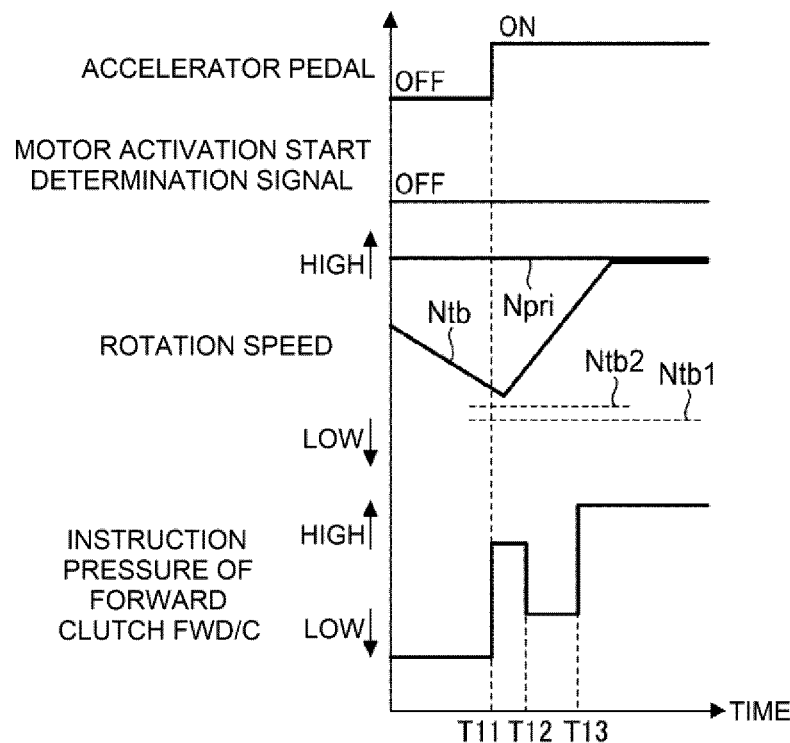
FIG. 5 is a diagram illustrating a second example of the timing chart according to the present embodiment.

FIG. 5 is a diagram showing a second example of the timing chart corresponding to the flowchart shown in FIG. 3. At a timing T11, as in the first example, the sailing stop condition is not satisfied since the accelerator pedal is ON. At the timing T11, the rotation speed Ntb is higher than the first rotation speed Ntb1. Therefore, in this example, when the accelerator pedal is depressed, the activation of the engine ENG caused by the fuel recovery and the supply of the hydraulic pressure to the forward clutch FWD/C are performed. In other words, in terms of timing, immediately after the accelerator pedal is depressed, the activation of the engine ENG caused by the fuel recovery and the supply of the hydraulic pressure to the forward clutch FWD/C are performed.

The hydraulic pressure can be supplied to the forward clutch FWD/C when the rotation speed Ntb is higher than the second rotation speed Ntb2. In this example, the rotation speed Ntb is higher than the second rotation speed Ntb2 at the timing T11. Therefore, the supply of the hydraulic pressure to the forward clutch FWD/C is started at the timing T11, the instruction pressure is set to the pre-charge pressure at the timing T11, to the stroke pressure at a timing T12, and to the full engagement pressure at a timing T13. As a result, the forward clutch FWD/C has the torque transmission capacity between the timing T12 and the timing T13. Further, the activation of the engine ENG caused by the fuel recovery is performed immediately after the timing T11, which is before the timing T12, and this causes the rotation speed Ntb to increase. In this example, at the timing T11, the rotation speed Ntb is higher than the first rotation speed Ntb1, so that the engine ENG is activated by fuel recovery, thereby quickly activating the engine ENG.

Figure 6:
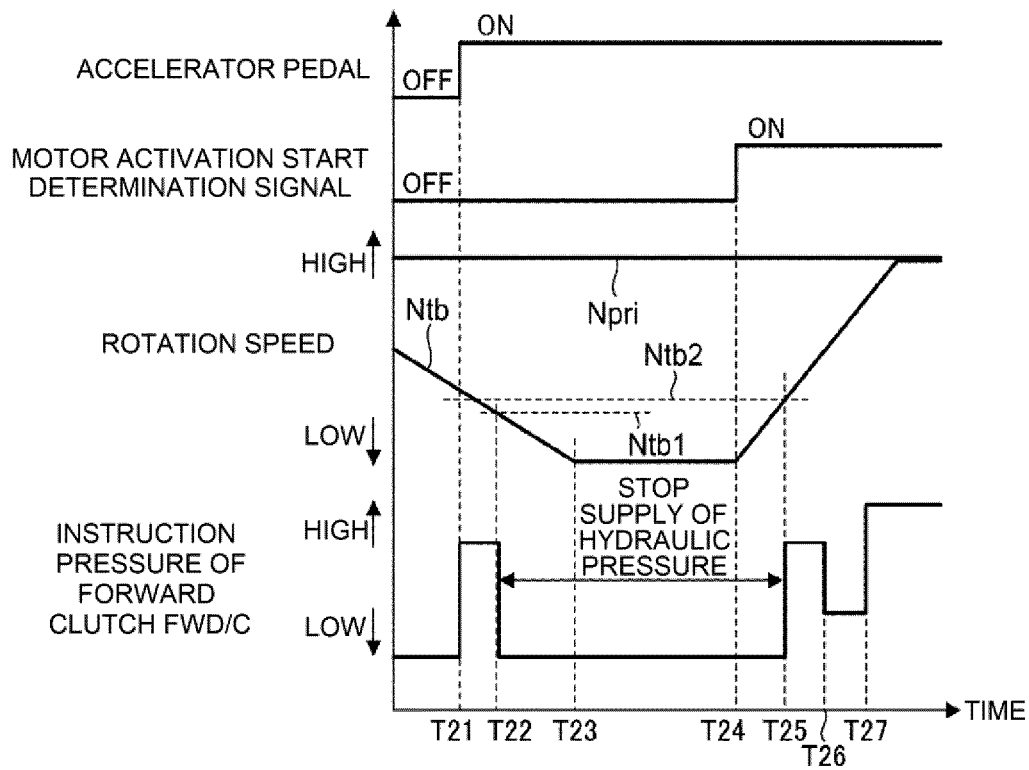
FIG. 6 is a diagram illustrating a third example of the timing chart according to the present embodiment.

FIG. 6 is a diagram showing a third example of the timing chart corresponding to the flowchart shown in FIG. 3. At a timing T21, as in the first and second examples, the sailing stop condition is not satisfied since the accelerator pedal is ON. At the timing T21, the rotation speed Ntb is higher than the first rotation speed Ntb1. Therefore, in this example, when the accelerator pedal is depressed, the activation of the engine ENG caused by the fuel recovery and the supply of the hydraulic pressure to the forward clutch FWD/C are performed, so that the hydraulic pressure is supplied to the forward clutch FWD/C at the timing T21 immediately after the accelerator pedal is depressed.

On the other hand, in this example, although an attempt is made to activate the engine ENG by the fuel recovery immediately after the accelerator pedal is depressed at the timing T21, the engine ENG is not activated (the rotation speed does not increase). As a result, the rotation speed Ntb continues to decrease and becomes equal to or lower than the first rotation speed Ntb1 at a timing T22. Therefore, immediately after the timing T22, the instruction pressure is set to the release instruction pressure, whereby the supply of the hydraulic pressure to the forward clutch FWD/C is stopped. The decreased rotation speed Ntb becomes constant at a timing T23, and from the timing T23 onwards, the engine ENG fluctuates in rotation at the low rotation speed Ne.

However, at this time, since the supply of the hydraulic pressure to the forward clutch FWD/C is already stopped, and the forward clutch FWD/C does not have the torque transmission capacity. Therefore, the rotation of the engine ENG caused by the drag of the forward clutch FWD/C is prevented, and the rotation of the engine ENG is quickly stopped at a timing T24. As a result, the motor activation start determination signal turns ON, and the engine ENG is activated, and thus the rotation speed Ntb increases. At a timing T25, the rotation speed Ntb is higher than the second rotation speed Ntb2, and the supply of the hydraulic pressure to the forward clutch FWD/C is resumed. The instruction pressure is set to the pre-charge pressure at a timing T25, to the stroke pressure at a timing T26, and to the full engagement pressure at a timing T27, and the forward clutch FWD/C is in a state having the torque transmission capacity between the timing T26 and the timing T27.

In FIGS. 4 to 6, the engine ENG and the forward clutch FWD/C merely need to be in the fuel supply stop state and the driving force cut-off state, and are not limited to being in the fuel supply stop state and the driving force cut-off state by the sailing stop control. Even in this case, by activating the engine ENG and supplying the hydraulic pressure to the forward clutch FWD/C in the same manner, it is possible to prevent the delay in activating the engine ENG and protect the belt BLT.

Next, main functions and effects of the present embodiment will be described.

(1) The control device for a vehicle according to the present embodiment is used in the vehicle that travels by transmitting the driving force from the engine ENG to the drive wheels DW via the forward clutch FWD/C. The present control device includes the controller 100 configured to stop the supply of the fuel to the engine ENG and release the forward clutch FWD/C to bring the forward clutch FWD/C into the driving force cut-off state when the accelerator pedal is turned OFF while the vehicle is traveling, activate the engine ENG and cause the forward clutch FWD/C to have the torque transmission capacity when the accelerator pedal is turned ON while the rotation speed Ntb is higher than the first rotation speed Ntb1 (that is, when the engine ENG has the rotation speed Ne higher than the first rotation speed Ne1) in the driving force cut-off state, and activate the engine ENG after the engine ENG stops rotating and cause the forward clutch FWD/C to have the torque transmission capacity after the engine ENG is activated when the accelerator pedal is turned ON while the rotation speed Ntb is equal to or lower than the first rotation speed Ntb1 (that is, when the engine ENG has the rotation speed Ne equal to or lower than the first rotation speed Ne1) in the driving force cut-off state.

According to such a configuration, when the accelerator pedal is turned ON after the rotation speed Ne decreases, the forward clutch FWD/C has no torque transmission capacity until the engine ENG is activated, and thus the engine ENG, which is to stop rotating, can be prevented from being dragged by the forward clutch FWD/C and rotating. As a result, the engine ENG can quickly stop rotating and then is activated. Therefore, it is possible to prevent the delay in activation of the engine ENG in response to the accelerator pedal operation while the vehicle is traveling, and to reduce the sense of discomfort felt by a driver. Further, since the forward clutch FWD/CL have the torque transmission capacity after the rotation of the engine ENG is stopped, the activation of the engine ENG during the reverse rotation is also avoided. Therefore, it is possible to prevent the engine ENG from acting as the large load on the activation.

(2) The vehicle includes the motor generator MG connected to the engine ENG via the motor belt BLT_MG. The engine ENG is activated by the motor generator MG. In this case, by avoiding the activation of the engine ENG during the reverse rotation, even when the rotation direction of the engine ENG cannot be grasped, it is possible to reduce the load on the motor belt BLT_MG which is interposed at the time of activating the engine ENG using the motor generator MG. As a result, this is significant in that further strength requirements for the motor belt BLT_MG can be prevented and durability of the motor belt BLT_MG can be improved.

(3) The forward clutch FWD/C is the hydraulic clutch. The controller 100 causes the forward clutch FWD/C to have the torque transmission capacity by supplying the hydraulic pressure to the forward clutch FWD/C. The controller 100 stops the supply of the fuel to the engine ENG and release the forward clutch FWD/C to bring the forward clutch FWD/C into the driving force cut-off state when the accelerator pedal is turned OFF while the vehicle is traveling, and in the case in which the engine ENG is activated and the hydraulic pressure is supplied to the forward clutch FWD/C when the accelerator pedal is turned ON while the rotation speed Ntb is higher than the first rotation speed Ntb1 in the driving force cut-off state, stops the supply of the hydraulic pressure to the forward clutch FWD/C when the rotation speed Ntb is equal to or lower than the first rotation speed Ntb1 after the supply of the hydraulic pressure to the forward clutch FWD/C is started.

According to such a configuration, even if the engine ENG fluctuates in rotation at the low rotation speed Ne after the first control is executed, the forward clutch FWD/C is not required to have the torque transmission capacity. Therefore, in such a case, it is possible to prevent the engine ENG from rotating due to the drag of the forward clutch FWD/C and to quickly stop the rotation of the engine ENG.

(4) The controller 100 activates the engine ENG after the supply of the hydraulic pressure to the forward clutch FWD/C is stopped and the engine ENG stops rotating, and when the rotation speed Ntb is higher than the second rotation speed Ntb2 that is higher than the first rotation speed Ntb1 (that is, when the rotation speed Ne of the engine ENG is higher than the second rotation speed Ne2 that is higher than the first rotation speed Ne1), the controller 100 resumes the supply of the hydraulic pressure to the forward clutch FWD/C.

According to such a configuration, the engine ENG can be activated quickly by appropriately performing the activation of the engine ENG and the supply of the hydraulic pressure to the forward clutch FWD/C when the engine ENG fluctuates in rotation at the low rotation speed Ne after the first control is executed.

Although the embodiment of the present invention has been described above, the above embodiment merely exemplifies some of application examples of the present invention and does not intend to limit the technical scope of the present invention to the specific configurations of the above embodiment.

In the embodiment of the present invention, although the sailing stop control has been described as the engine stop control, the present invention is not limited to the sailing stop control and may be applied to, for example, coast stop control. The coast stop control is executed when a coast stop condition is satisfied. The coast stop condition is a condition including that the vehicle speed VSP is a low vehicle speed (lower than a preset vehicle speed), that the accelerator pedal is not depressed, that the brake pedal is depressed, and that the forward range is selected in the transmission TM. The set vehicle speed is, for example, the vehicle speed VSP at which the lock-up clutch LU is released.

The present application claims a priority based on Japanese Patent Application No. 2022-044241 filed with the Japan Patent Office on Mar. 18, 2022, all the contents of which are hereby incorporated by reference.

DESCRIPTION OF REFERENCE SIGNS 12 transmission controller
13 engine controller
100 controller (computer)
BLT_MG motor belt (belt)
CL clutch
DW drive wheel
ENG engine
FWD/C forward clutch (clutch)
MG motor generator (motor)

The invention claimed is:

1. A control device for a vehicle that travels by transmitting a driving force from an engine to a drive wheel via a clutch, the control device comprising:
a controller, wherein
the controller is configured to:
stop a supply of a fuel to the engine and release the clutch to bring the clutch into a driving force cut-off state when an accelerator is not operated while the vehicle is traveling,
activate the engine and cause the clutch to have a torque transmission capacity when the accelerator is operated while the engine has a rotation speed higher than a first rotation speed in the driving force cut-off state; and
activate the engine after the engine stops rotating and cause the clutch to have the torque transmission capacity after the engine is activated when the accelerator is operated while the engine has a rotation speed equal to or lower than the first rotation speed in the driving force cut-off state.

2. The control device for a vehicle according to claim 1, wherein
the vehicle includes a motor connected to the engine via a belt, and
the engine is activated by the motor.

3. The control device for a vehicle according to claim 1, wherein
the clutch is a hydraulic clutch,
the controller causes the clutch to have the torque transmission capacity by supplying the hydraulic pressure to the clutch,
when the accelerator is not operated while the vehicle is traveling, the controller stops the supply of the fuel to the engine and release the clutch to bring the clutch into the driving force cut-off state, and
in the case in which the engine is activated and the hydraulic pressure is supplied to the clutch when the accelerator is operated while the engine has the rotation speed higher than the first rotation speed in the driving force cut-off state, the controller stops the supply of the hydraulic pressure to the clutch when the rotation speed of the engine is equal to or lower than the first rotation speed after the supply of the hydraulic pressure to the clutch is started.

4. The control device for a vehicle according to claim 3, wherein
the controller activates the engine after the supply of the hydraulic pressure to the clutch is stopped and the engine stops rotating, and when the rotation speed of the engine is higher than a second rotation speed that is higher than the first rotation speed, resumes the supply of the hydraulic pressure to the clutch.

5. A control method for a vehicle that travels by transmitting a driving force from an engine to a drive wheel via a clutch, the control method comprising:
stopping a supply of a fuel to the engine and releasing the clutch to bring the clutch into a driving force cut-off state when an accelerator is not operated while the vehicle is traveling,
activating the engine and causing the clutch to have a torque transmission capacity when the accelerator is operated while the engine has a rotation speed higher than a first rotation speed in the driving force cut-off state; and
activating the engine after the engine stops rotating and causing the clutch to have the torque transmission capacity after the engine is activated when the accelerator is operated while the engine has a rotation speed equal to or lower than the first rotation speed in the driving force cut-off state.

6. A non-transitory computer-readable medium storing a program executable by a computer of a vehicle that travels by transmitting a driving force from an engine to a drive wheel via a clutch, the program causing the computer to execute procedures of:
stopping a supply of a fuel to the engine and release the clutch to bring the clutch into a driving force cut-off state when an accelerator is not operated while the vehicle is traveling,
activating the engine and causing the clutch to have a torque transmission capacity when the accelerator is operated while the engine has a rotation speed higher than a first rotation speed in the driving force cut-off state; and
activating the engine after the engine stops rotating and causing the clutch to have the torque transmission capacity after the engine is activated when the accelerator is operated while the engine has a rotation speed equal to or lower than the first rotation speed in the driving force cut-off state.

* * * * *